Feb. 4, 1947.  O. J. HOBSON  2,415,283
ELLIPSOGRAPH
Filed April 17, 1944

INVENTOR
OLIVER J. HOBSON
BY Charles S. Evans
HIS ATTORNEY

Patented Feb. 4, 1947

2,415,283

UNITED STATES PATENT OFFICE 2,415,283

ELLIPSOGRAPH

Oliver J. Hobson, Redwood City, Calif.

Application April 17, 1944, Serial No. 531,371

5 Claims. (Cl. 33—30)

My invention relates to instruments for drawing ellipses; and the principal object of my invention is the provision of an instrument with which a draftsman may readily draw an accurate ellipse of desired proportions.

Secondary objects include the provision of such an instrument which supports the scribing point over a clear space, so that curves can be drawn free of interference from any part of the instrument; and also an instrument in which adjustments are readily made to draw ellipses having specific major and minor diameters.

My invention possesses other objects and features of value, some of which with the foregoing will be set forth in the following description of the invention. It is to be understood that I do not limit myself to the showing made by the said description and the drawing as I may adopt variant forms of the invention within the scope of the appended claims.

Referring to the drawing.

In terms of broad inclusion the curve generating device of my invention as shown by Figures 1 to 4 inclusive, comprises pantograph arms so mounted and controlled that the scribing point moves in full scale in one direction, but in a selected proportional scale in a direction at right angles to the full scale direction. When this modified pantograph reduction is applied to a circle, a symmetrical closed curve may be traced which in its long diameter is the diameter of the circle, but in its short diameter bears a predetermined ratio to the circle diameter.

The curve fulfills the technical definition of a true ellipse and quite satisfactorily supplies the curves required in perspective views of circular or cylindrical objects.

Figure 1:
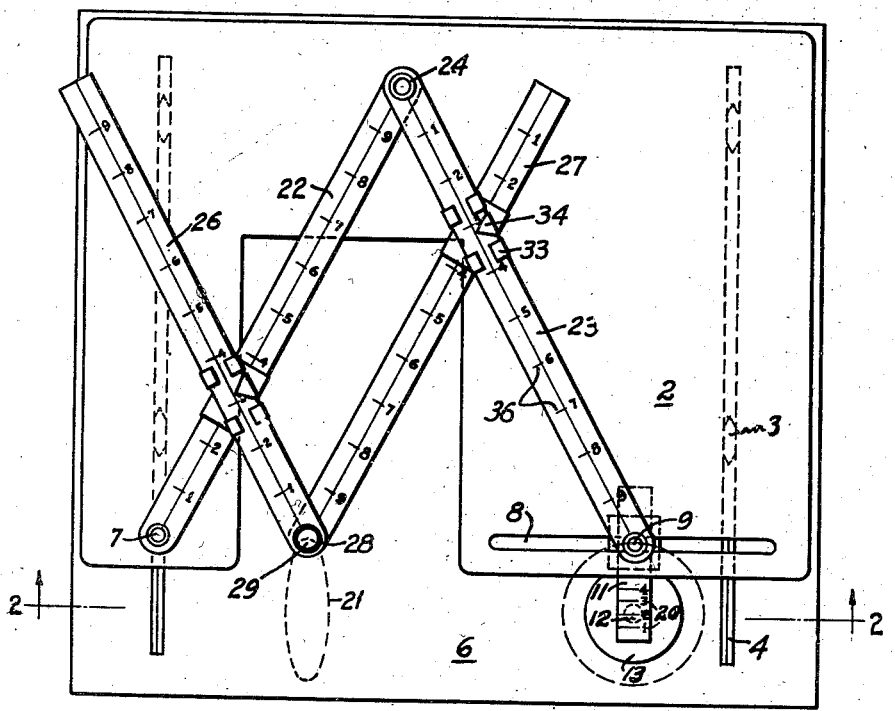
Figure 1 is a plan view of one embodiment of my invention.
Figure 2:
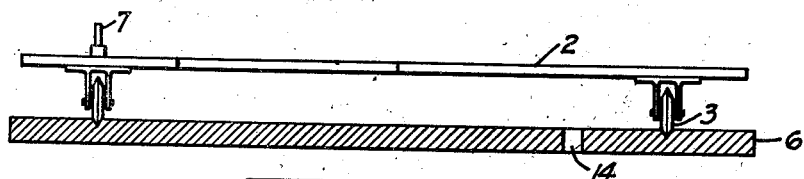
Figure 2 is a front elevation partly in section, of the supporting base and rolling carriage only. The plane of section is indicated by the line 2—2 of Figure 1.

The instrument shown in Figure 1 comprises a carrier or carriage which is mounted on a track to move back and forth over a platen or table on which the paper which is to receive the figure is laid. A crank of adjustable throw is arranged to turn about a bearing fixed in the table; and is so connected to the carrier that the carriage is reciprocated on the track. A pair of links, pivoted together at their ends, is mounted with the free end of one link journaled on the crank and the free end of the other link pivoted on the carriage. A second pair of pivoted links is adjustably and pivotally connected to the first pair in the shape of a parallelogram; and the scribing point is preferably supported in the axis of the pivotal connection of the second pair of links. The proportions and arrangement of parts is such that the scribing point lies in a line connecting the axes of the crank and pivotal connection of the first pair of links to the carriage. When these conditions are fulfilled the scriber traces a true ellipse. With other settings, or with the scriber carried, for example, on one of the links intermediate the ends, other curves would be traced, but these are not part of the presently intended use of the instrument; and the possibilities in this direction need not be here explored.

A carriage or carrier 2 is provided with wheels 3 designed to run in the track-ways 4 formed in the upper face of the table or platen 6. This allows the table to move back and forth, each point on it traveling in a straight line. A pivot pin 7 is fixed adjacent one corner of the carrier, which is cut away as shown in Figure 1 to provide a working space for the scribing point. In the opposite side of the carrier and in line with the pivot pin 7, is a slot 8, in which the crank pin 9 is arranged to move back and forth as the crank arm 11 turns about its pivotal mounting stud 12.

The stud extends downwardly from the flat base 13 provided to give stability to the crank arm and is journaled in the bearing hole 14 in the platen. Extending upwardly from the base 13 is the post or standard 16 to the top of which the crank arm 11 is fixed.

The crank arm is rectangular in cross-section; and forms a slideway for the block 18 in which the crank pin 9 is fixed. A screw 19 permits clamping the block in a selected position on the crank arm to vary the throw of the crank pin, and graduations 20 on the crank arm facilitate this setting; providing guidance in the selection of the major diameter of the proposed ellipse 21. It will be understood of course that with the crank pin engaged in the slot 8, the carrier is moved back and forth by the turning of the crank, a distance equal to twice the throw of the crank pin.

Means are provided for connecting the pivot pin 7 which moves back and forth with the carrier in a straight line, to the crank pin 9 which moves around in a circle, and for supporting a scriber on the connecting means. A pair of links 22 and 23, connected together at one of their ends by the pivot 24, are connected at their other ends to the pivot pin 7 and crank pin 9; and carried by these links are two other links 26 and 27 connected at one of their ends by the pivot 28 in which a scriber 29 is held. Conveniently the connection may be a simple grommet of a size to hold frictionally the scribing point.

Figure 3:
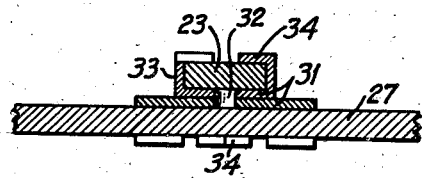
Figure 3 is a detail in vertical central section and on an enlarged scale of the pivotal slide joint in which the halves are at right angles to each other.
Figure 4:
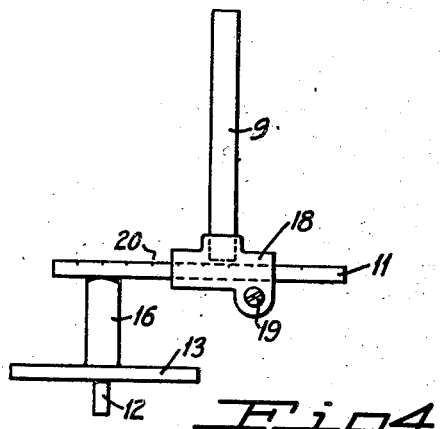
Figure 4 is a side elevation, on an enlarged scale of the rotary head of the instrument.

The second pair of links are connected to the first pair to form a parallelogram with the point of the scriber in the line connecting the center of pivot pin 7 and the longitudinal center line of the groove 8. The connecting device is shown in Figure 3 and each comprises a pair of like spring clips 31 pivoted together by the pin 32, and having spring arms 33 resiliently engaging around the body of the link. A pointed tab 34 centrally placed on one side provides a convenient indicator for placing the center of the pivot pin 32 at any desired setting relative to the graduations 36 on the links. These graduations are preferably placed on both sides of links 22 and 27; and for accurate setting, the link assembly is preferably lifted off of the pins 7 and 9, so that the indicator points of the tabs 34 can be brought into close register with the graduations, which are calculated to provide guidance relative to the minor axis of the proposed ellipse 21.

*Operation.*—The major axis of the proposed ellipse is the same as twice the throw of the crank pin 9; that is, the same as the diameter of the circle generated by the center of the crank pin. The block 18 is therefore adjusted on the crank arm to give the desired throw. The graduations 20 may be in inches, centimeters, or an arbitrary unit as desired. The links are then adjusted to form a parallelogram with the scriber point aligned with the slot 8 as above explained. While it is mechanically impossible in this embodiment of my invention to coincide the scriber point with the axis of either the pivot pin 7 or the crank pin 9, such positions theoretically fix the minimum and maximum values of the minor axis of the ellipse generated, that is from zero value to the length of the major axis. The nearer the pivotal connections between the links to the pivots 7 and 24, the flatter the ellipse. Moving the pivotal connections toward the pivots 24 and 9 lengthens the minor axis. Here too the graduations may be in any desired units best fitted to extend usefulness and facility in handling.

After setting the instrument, the paper on which the ellipse is to be drawn is placed in position under the scriber, and held securely while the crank pin is manually rotated through one revolution.

I claim:

1. A device for drawing ellipses comprising a carrier, track means on which the carrier may move back and forth, a fixed bearing, a crank pin mounted for turning about the bearing, means connecting the crank pin with the carrier to reciprocate the carrier when the crank is turned, a pair of links pivoted together, the free end of one of the links being journaled on the crank pin and the free end of the other link being pivoted to the carrier, and a second pair of links pivoted together and to the first pair at points intermediate the ends of the latter to form therewith a parallelogram, and means on the second pair of links for holding a scriber.

2. A device for drawing ellipses comprising a carrier, track means on which the carrier may move back and forth, a fixed bearing, a crank pin mounted for turning about the bearing, means connecting the crank pin with the carrier to reciprocate the carrier when the crank is turned, a pair of links pivoted together, the free end of one of the links being journaled on the crank pin and the free end of the other link being pivoted to the carrier, a second pair of links pivoted together and pivoted to the first pair to form therewith a parallelogram, and means at the pivotal connection of the second pair of links for holding a scriber.

3. A device for drawing ellipses comprising a carrier, track means on which the carrier may move back and forth, a fixed bearing, a crank pin mounted for turning about the bearing, a slot in the carrier at right angles to the line of its movement on the track means and in which the crank pin may reciprocate to reciprocate the carrier when the crank is turned, a pair of equal links pivoted together, the free end of one of the links being pivoted on the crank pin and the free end of the other link being pivoted to the carrier at a point in alignment with the longitudinal axis of said slot, a second pair of links pivoted together and pivoted to the first pair at points intermediate the ends of the latter to form therewith a parallelogram, and means on the second pair of links for holding a scriber.

4. A device for drawing ellipses comprising a carrier, track means on which the carrier may move back and forth, a fixed bearing, a crank pin mounted for turning about the bearing, a slot in the carrier at right angles to the line of its movement on the track means and in which the crank pin may reciprocate to reciprocate the carrier when the crank is turned, a pair of equal links pivoted together, the free end of one of the links being pivoted on the crank pin and the free end of the other link being pivoted to the carrier at a point in alignment with the longitudinal axis of said slot, a second pair of links pivoted together and pivoted to the first pair at points intermediate the ends of the latter to form therewith a parallelogram, and means on the second pair of links for holding a scriber in alignment with the said longitudinal axis of the slot.

5. A device for drawing ellipses comprising a carrier, track means on which the carrier may move back and forth, a fixed bearing, a crank pin mounted for turning about the bearing, means connecting the crank pin with the carrier to reciprocate the carrier when the crank is turned, a pair of links pivoted together, the free end of one of the links being journaled on the crank pin and the free end of the other link being pivoted to the carrier, and means supported on the links for holding a scriber.

OLIVER J. HOBSON.

REFERENCES CITED

The following references are of record in the file of this patent:

UNITED STATES PATENTS

| Number | Name | Date |
|---|---|---|
| 184,493 | Anderson | Nov. 21, 1876 |
| 731,018 | Carlton | June 17, 1903 |
| 957,114 | Shea | May 3, 1910 |